US011903417B2

(12) United States Patent
Wang et al.

(10) Patent No.: US 11,903,417 B2
(45) Date of Patent: *Feb. 20, 2024

(54) HEATER, CARTRIDGE, AND VAPORIZATION DEVICE USING THE SAME

(71) Applicant: SHENZHEN GEEKVAPE TECHNOLOGY CO., LTD., Shenzhen (CN)

(72) Inventors: Xianghui Wang, Shenzhen (CN); Wenlong Lu, Shenzhen (CN)

(73) Assignee: SHENZHEN GEEK VAPE TECHNOLOGY CO., LTD., Shenzhen (CN)

( * ) Notice: Subject to any disclaimer, the term of this patent is extended or adjusted under 35 U.S.C. 154(b) by 396 days.

This patent is subject to a terminal disclaimer.

(21) Appl. No.: 17/161,587

(22) Filed: Jan. 28, 2021

(65) Prior Publication Data

US 2021/0153553 A1 May 27, 2021

Related U.S. Application Data

(63) Continuation of application No. 16/361,175, filed on Mar. 21, 2019, now Pat. No. 10,993,478, which is a continuation of application No. PCT/CN2019/072331, filed on Jan. 18, 2019.

(51) Int. Cl.

| | |
|---|---|
| ***A24F 40/42*** | (2020.01) |
| ***H05B 3/00*** | (2006.01) |
| ***A24F 40/44*** | (2020.01) |

(52) U.S. Cl.

CPC .............. *A24F 40/42* (2020.01); *A24F 40/44* (2020.01); *H05B 3/0014* (2013.01); *H05B 2203/021* (2013.01)

(58) Field of Classification Search

CPC ....... A24F 40/42; A24F 40/44; H05B 1/0244; H05B 3/0014; H05B 2203/021

See application file for complete search history.

(56) References Cited

U.S. PATENT DOCUMENTS

| | | | |
|---|---|---|---|
| 2013/0228191 A1 | 9/2013 | Newton | |
| 2014/0261500 A1 | 9/2014 | Park | |
| 2015/0059787 A1 | 3/2015 | Qiu | |
| 2016/0021930 A1 | 1/2016 | Minskoff et al. | |

(Continued)

FOREIGN PATENT DOCUMENTS

| | | |
|---|---|---|
| CN | 104114050 A | 10/2014 |
| CN | 104856234 A | 8/2015 |

(Continued)

OTHER PUBLICATIONS

Translation of CN 205040654 (Year: 2016).*

(Continued)

*Primary Examiner* — Thor S Campbell
(74) *Attorney, Agent, or Firm* — BAYES PLLC

(57) ABSTRACT

A heater and a vaporization device using the same are provided. The heater comprises an end for insertion into a cartridge, a body having a sidewall and at least one opening on the sidewall, and a chamber inside the body. The end has an outlet. The chamber and the opening provide an airflow path for an aerosol to be vented outside the heater through the outlet. The aerosol is generated from the vaporizable material when the body is heated.

19 Claims, 13 Drawing Sheets

(56) References Cited

U.S. PATENT DOCUMENTS

| | | | | |
|---|---|---|---|---|
| 2016/0295919 | A1 | 10/2016 | Thomas, Jr. | |
| 2016/0309783 | A1 | 10/2016 | Hopps et al. | |
| 2017/0042245 | A1* | 2/2017 | Buchberger | A24F 40/48 |
| 2017/0164655 | A1 | 6/2017 | Chen | |
| 2017/0340014 | A1* | 11/2017 | Batista | F22B 1/284 |
| 2018/0169357 | A1 | 6/2018 | Reevell | |
| 2018/0249761 | A1* | 9/2018 | Servutas | A24F 40/485 |
| 2018/0303166 | A1 | 10/2018 | Qiu | |

FOREIGN PATENT DOCUMENTS

| | | | |
|---|---|---|---|
| CN | 205040654 | U | 2/2016 |
| CN | 107836751 | A | 3/2018 |
| WO | 2014110119 | A1 | 7/2014 |

OTHER PUBLICATIONS

International Search Report and Written Opinion in corresponding International Application No. PCT/CN2019/072331, dated Oct. 14, 2019, 10 pages.

1 First Office Action issued in related Chinese Application No. 201910117340.5, dated Jan. 27, 2021, 4 pages.

* cited by examiner

HEATER, CARTRIDGE, AND VAPORIZATION DEVICE USING THE SAME

CROSS REFERENCE TO RELATED APPLICATION

This application is continuation of U.S. patent application Ser. No. 16/361,175, filed Mar. 21, 2019, which is a continuation of International Application No. PCT/CN2019/072331, filed on Jan. 18, 2019, each of which is hereby incorporated by reference in its respective entirety.

TECHNICAL FIELD

The present disclosure relates to a heater, a cartridge, and a vaporization device using the heater and the cartridge, and more particularly to an electronic vaporization device using a heater and a heater-less cartridge.

BACKGROUND

A vaporization device, such as an electronic cigarette or e-cigarette, has become a popular alternative to a traditional tobacco cigarette in recent years, partly for the reason that a majority of toxicants commonly found in tobacco smoke do not exist in vapor inhaled by user of the vaporization device. In addition, a vaporization device is more entertaining than tobacco as the e-liquid, a liquid mixture vaporized by the device, has thousands of flavors for user to choose from.

Since its inception in early 2000s, a modern electronic vaporization device ("EVD") has continuously evolved in its design. The basic design of the device has a tank holding the e-liquid and a heating element inside the tank that vaporizes the e-liquid. The heating element is often in the shape of a coil and has to be discarded along with the tank after the e-liquid is consumed or the tank becomes dysfunctional, even though the heating element might still be in a good working condition. This brings the problems of unnecessary waste of components, higher cost of a replacement tank, and increased weight of the tank. The increased cost and weight further make it harder for a frequent user of these devices to purchase and carry a large number of the replacement tanks, and also hampers his or her desire to share and enjoy the electronic vaporization device with others on business and recreational occasions.

In light of the above, there is a need to re-design the vaporization device to reduce its costs and weight.

SUMMARY

The present disclosure relates to apparatuses for heating and vaporizing certain vaporizable materials. More specifically, such apparatuses may include heaters, cartridges, and vaporization devices using the heaters and the cartridges.

In one aspect, embodiments of the disclosure provide a heater for use with a vaporization device. The heater may include a first end for insertion into a heater-less cartridge housing a vaporizable material, a body having a sidewall and at least one opening on the sidewall, and a chamber inside the body. The first end has an outlet. The chamber and the at least one opening provide an airflow path for an aerosol to be vented outside the heater at least through the outlet. The aerosol is generated from the vaporizable material when the body is heated.

In another aspect, embodiments of the disclosure provide a heater-less cartridge for use with a vaporization device. The heater-less cartridge comprises a casing having a top end, a bottom end, and a longitudinal axis extending through the top end and the bottom end, an aerosol outlet at or near the top end, a container housing a vaporizable material, a wick in contact with the vaporizable material, and a support at least partially extending along the longitudinal axis. The support is moved to expose the aerosol outlet when a heater is inserted into the heater-less cartridge.

In a further aspect, embodiments of the disclosure provide a vaporization device, which comprises a heater, a cartridge, and a base. The heater comprises a first end for insertion into the cartridge, a body having a sidewall and at least one opening on the sidewall, and a chamber inside the body. The first end has an outlet. The chamber and the at least one opening provide an airflow path for an aerosol to be vented outside the heater at least through the outlet. The cartridge comprises a casing having a top end, a bottom end, and a longitudinal axis passing through the top end and the bottom end, an aerosol outlet at or near the top end, a container housing a vaporizable material, a wick in contact with the vaporizable material, and a support at least partially extending along the longitudinal axis. The base comprises a power source for providing energy to heat the heater. The aerosol is generated from the vaporizable material when the body is heated. The support is moved to expose the aerosol outlet when a heater is inserted into the cartridge.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
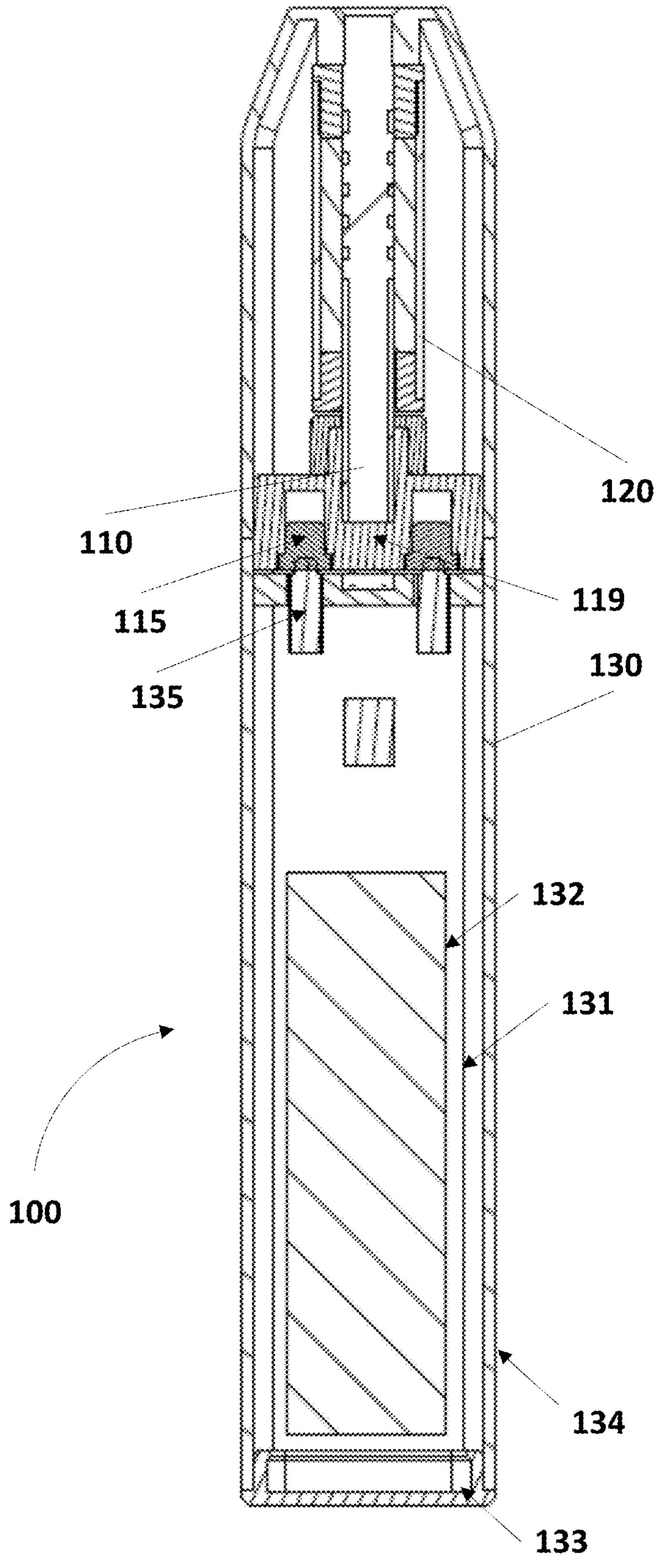
FIG. 1 illustrates a schematic diagram of an exemplary vaporization device, consistent with some disclosed embodiments.

FIG. 1 illustrates a schematic diagram of an exemplary vaporization device, consistent with some disclosed embodiments. Although the following description uses a pod system as an implementation of the present disclosure, it is noted that this is just one example and a person of ordinary skill in the art would know, with the teaching of the present disclosure, that the same disclosure can be implemented on other vaporization devices while achieving the same purpose of the present disclosure.

A vaporization device can be electronic or non-electronic. For a non-electronic vaporization device ("NEVD"), heat may be provided from a heat source not directly powered by electricity to raise the temperature of the heater inside the device, thereby vaporizing the material stored in a chamber of the cartridge to generate an aerosol for user to inhale. Examples of such heat sources include lighter, microwave, ultrasound, infrared, etc. For instance, a tip end of the NEVD may be heated by the heat source, and the thermal energy may be transmitted to the heater, which is thermally connected to the tip end. For the purpose of this disclosure, "thermally connect(ed/s)" or "thermal connection" means that there is a flow of thermal energy between two or more components when they are connected by a path permeable to heat. The heater may generate an aerosol inside the chamber of the cartridge from the vaporizable material. An aerosol so generated, also called vapor, may contain a suspension of fine solid particles or liquid droplets. When the user puffs an outlet on the NEVD, the aerosol is expelled from the chamber and inhaled by the user.

An electronic vaporization device ("EVD") 100, as shown in FIG. 1, may include a heater 110, a cartridge 120, and a base 130. An EVD is often powered by one or more batteries. The battery may be an alkaline battery, a lithium-ion battery, or any other type of battery that is able to provide operation voltage of the EVD, commonly in the range of 0.1V-15V. The batteries may be primary batteries that are not rechargeable or secondary batteries that are rechargeable. Primary batteries use materials whose chemical reactions are not easily reversible. They are superior than secondary batteries (a.k.a. rechargeable batteries) in terms of energy densities and initial purchase cost. On the other hand, secondary batteries are more economic in the long run as the batteries are reusable after each recharge.

Consistent with some embodiments of the present disclosure, EVD 100 may use one secondary lithium-ion battery 132 housed in battery compartment 131 of base 130. It is noted that the number and the type of batteries are not limited to these embodiments. In the case of NEVDs, base 130 may include other types of power source that may provide thermal energy to heater 110 without direct use of electricity.

Battery 132 may be recharged outside of base 130 by a battery charger (not shown). This can be done by simply removing battery 132 from a cover 133 attached to the bottom. Alternatively, battery 132 may be recharged through a recharging circuit (not shown) within base 130, which can be plugged into an external power source via port 134 on the side of base 130. Port 134 may be a USB port, a mini-USB port, a micro-USB port, a USB-C port, or other types of suitable ports that provide power to the recharging circuit for the purpose of recharging battery 132. In some embodiments, port 134 may be provided on the other part of the outer surface of EVD 100, not just the location shown in FIG. 1.

Figure 2:
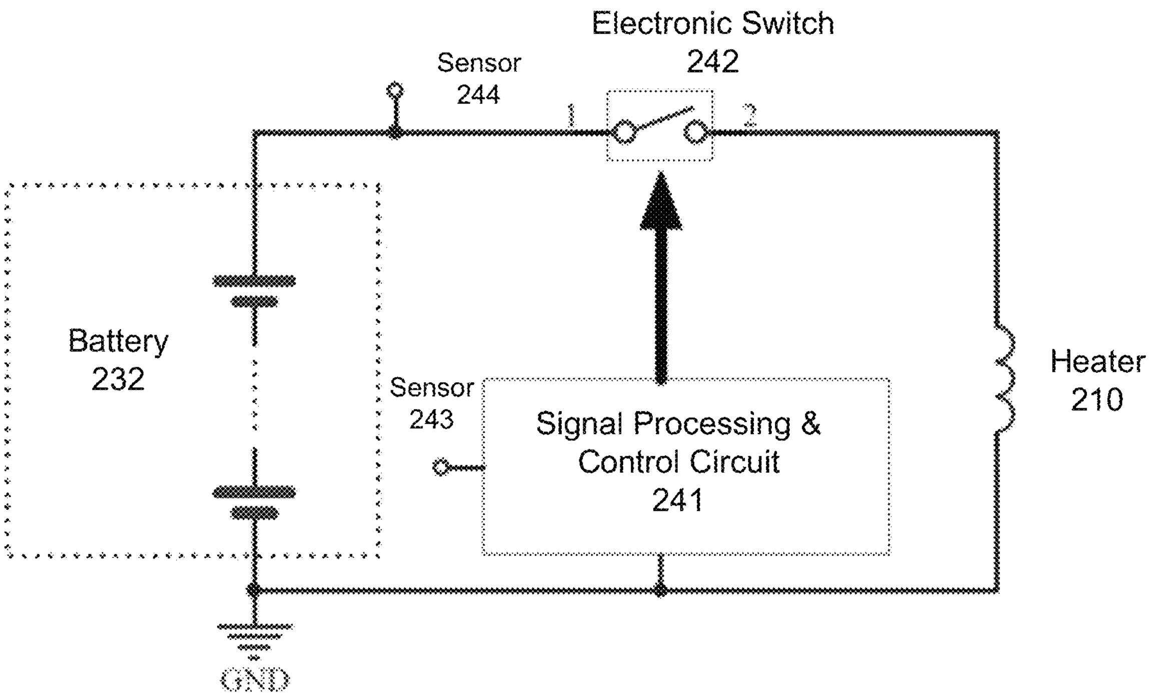
FIG. 2 illustrates a circuit diagram of an exemplary EVD, consistent with some disclosed embodiments.

FIG. 2 illustrates a circuit diagram of an exemplary EVD, consistent with some embodiments of the current disclosure. Similar to the embodiments above, EVD may include a battery 232. Battery 232 may be designed to have two terminals—cathode and anode. One terminal may be connected to the ground and the other to an electronic switch 242, as shown in FIG. 2. The symbol for heater 210 in FIG. 2 indicates that it uses a resistive heating element, which generates heat when current passes through. The power of heating generated by heater 210 is proportional to the products of its resistance and the square of the current. The resistance of a heater typically used in an EVD is in the range of 0.01Ω to 10Ω. That said, the heater type is not limited to a resistive heating element. As long as it can convert electrical energy to heat, other types of heater may be used in an EVD consistent with the current disclosure. For example, heater 210 may be a conductive coil (e.g. copper) capable of heating by magnetic induction when an alternate electric (AC) current passes through the coil and induces an electrical current in a metal body of the heater. The conductive coil may surround at least a part of the body. There may be a gap between the conductive coil and the part of the body surrounded by the conductive coil, so that when the heater is inserted into a heater-less cartridge, a wick inside the cartridge may be disposed between the body and the conductive coil. Thus, the wick finds its location in the assembled vaporization device and will not be easily dislocated when the device is carried around.

The EVD according to FIG. 2 may further include an electronic switch 242 and a signal processing and control circuit 241, both of which are commonly grounded with battery 232. Electronic switch 242 may be coupled to a first sensor 243 of the EVD. Sensor 243 may be a push button or a switch on the outer surface of the EVD, or a pressure sensor inside the EVD that may be activated upon inhaling by user. When turned on, the circuit is closed and the current starts to pass through heater 210 to generate heat. When turned off, the circuit becomes open, the current stops flowing between the terminals, and heat is no longer generated. The ON/OFF of electronic switch 242 may be further controlled by signal processing and control circuit 241, which may be coupled to sensor 243 and electronic switch 242. When sensor 243 is activated by a push, switch, or inhaling action of the user, an electrical signal may be sent to signal processing and control circuit 241. Signal processing and control circuit 241 may process the signal with a predetermined algorithm, and send an ON/OFF signal to electronic switch 242 to turn the circuit on or off.

The circuit in FIG. 2 may further include a second sensor 244. Sensor 244 may be a supplemental activation sensor. For example, when sensor 243 is a push button, sensor 244 may be a pressure sensor. A pressure sensor is activated when it senses an air flow that exceeds a threshold pressure value. The air flow may be created by user inhaling from the mouthpiece of the EVD. The heating operation in these embodiments is activated when user actions are sensed by both sensors, for example, pushing sensor 243 while inhaling. Such a design may enhance the safety features of the EVD by eliminating inadvertent activation of heating in an EVD that only has one sensor for heating activation. In other embodiments, sensor 244 may alternatively be a short-circuit detection sensor. Short circuit occurs when the electrical impedance in the circuit is very low or close to zero, which results in an excessive amount of current flowing in the circuit. Sensor 244 may automatically cause an open circuit when it detects the amount of current is above the normal operation current or close to the maximum operation current of the circuit, which is typically in the range of 0.1 A-60 A. For example, when the detected current is more than 80% of the maximum operation current, sensor 244 may cause an open circuit and cut off the current flow. Therefore, a short-circuit detection sensor adds another layer of safety to the EVD.

Referring back to FIG. 1, EVD 100 may further include heater 110. Heater 110 may include a resistive heating element, or any other type of heating element that is able to convert electrical energy to heat. In some embodiments consistent with the current disclosure, electric power may be transferred from base 130 to the heating element of heater 110 via contacting electrodes 115 and 135. Electrode 135 may be a pair of electrode tabs attached to or embedded in base 130, and electrode 115 may be a pair of electrode tabs attached to or embedded in the bottom portion of heater 110. Each tab of electrode 135 corresponds to, and forms a current flow path with, a tab of electrode 115. When electrode 135 contacts with electrode 115, a circuit for providing heat-generating current to the resistive heating element is formed.

Heater 110 may further include an affixation element 119. Affixation element 119 is configured to affix the bottom end of heater 110 to base 130 by, for example, a locking feature (not shown). One purpose of affixation element 119 is to keep solid contact between electrodes 135 and 115 so that the circuit will not be cut off when a strong external force (e.g., dropping off to the ground or abnormal puffing) would otherwise cause a dislocation of heater 110.

Figure 3A:
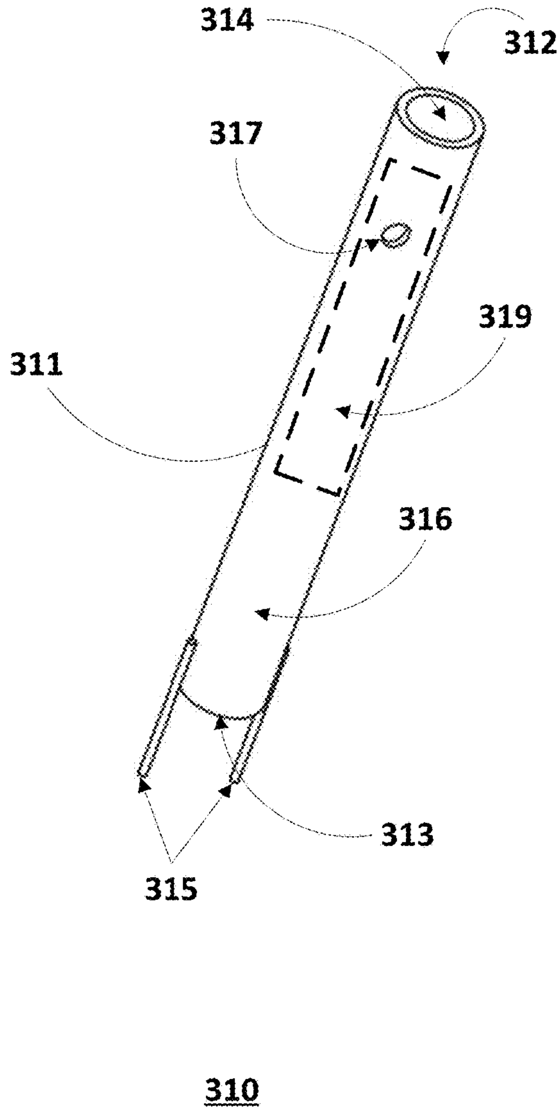
FIGS. 3A-3B illustrate schematic diagrams of an exemplary heater, consistent with some disclosed embodiments.
Figure 3B:
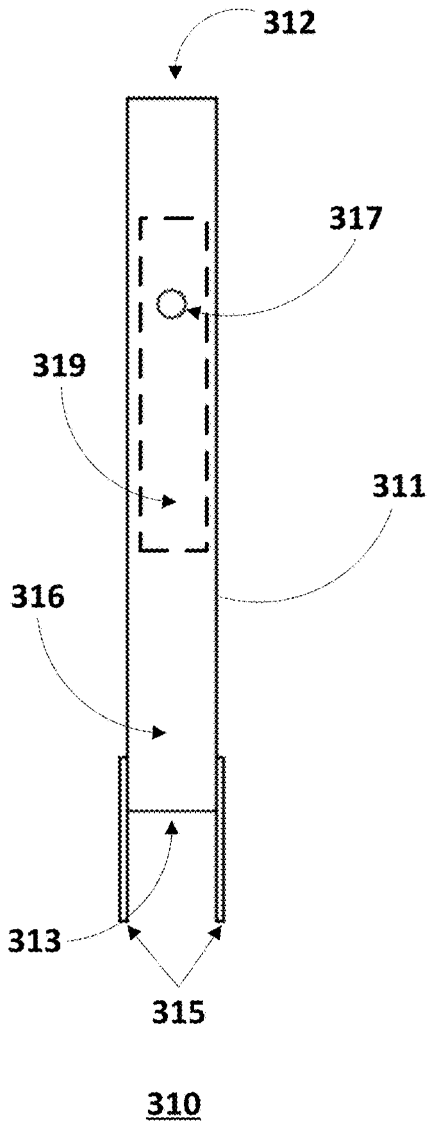

Unlike conventional single-purpose heaters, the heater according to the current disclosure may serve two functions. The first function, as its name indicates, is to heat a vaporizable material to create an aerosol. The second function is to provide an airflow path for the aerosol to be vented outside the heater through an outlet of the heater. The airflow path is partially formed by a chamber defined by a sidewall and at least one opening on the sidewall of the heater. FIGS. 3A and 3B illustrate schematic diagrams of an exemplary heater, consistent with some disclosed embodiments of the current disclosure.

Consistent with embodiments of the present disclosure, heater 310 may include a body 311 and two ends 312, 313. As discussed above, end 313 may be embedded in or attached with electrodes that are coupled with electrodes from the power source. Heater 310 may further have an electric wire 315 that thermally connects the electrodes with the heater body, as shown in FIGS. 3A and 3B. Thus, thermal energy converted from electric power may be provided from the power source to body 311.

End 312 may be used for insertion into a cartridge of a vaporization device, which has a vaporizable material inside but lacks a heater commonly seen in the cartridges on the market (e.g. a coil). Such a cartridge may be called a "heater-less cartridge." After being inserted into a heater-less cartridge, heater 310 may provide heat to create an aerosol from the vaporizable material. The process of creating an aerosol is also known as "aerosolization," where a physical substance is converted into particles small and light enough to be carried away by air. In the application of EVD, an aerosol may be created by vaporization when the heater raises the temperature of the vaporizable material to a range of, for example, 100-280° C.

To achieve the insertion, end 312 may be harder than the surface of the cartridge against which heater 310 is inserted. Hardness is a measurement of the resistance to localized deformation induced by either mechanical indentation or abrasion, and is dependent on a number of factors, such as ductility, elastic stiffness, strength, toughness, strain, plasticity, etc. Several different scales may be used to measure the hardness of a known material. For example, the Brinell scale measures the indentation hardness of the material through the scale of penetration of an indenter, loaded on a material test-piece. The indenter may be a steel ball of 10 mm diameter with a 3,000 kgf force. The Rockwell scale determines the indentation hardness of the material by measuring the depth of penetration of an indenter under different loads. The most commonly used Rockwell scales are the "B" and "C" scales, which respectively use a 1/16-inch-diameter (1.588 mm) steel sphere with a 100 kgf load and a 120° diamond sphero-cone with a 150 kgf load. The Vickers scale is an alternative to the Brinell scale and measures the hardness of the material without considering the size of the indenter. Table 1 below lists tested results of hardness values of some materials suitable for making end 312.

TABLE 1

Hardness Values of Certain Materials

| Material | Brinell Scale | Rockwell Scale | Vickers Scale |
|---|---|---|---|
| SS304 (Stainless Steel) | 187 HB | 90 HRB | 200 HV |
| SS316 (Stainless Steel) | 152 HB | 95 HRB | 160 HV |
| SS316L (Stainless Steel) | 152 HB | 76-80 HRB | 160 HV |
| Nichrome | 190-220 HB | 50-80 HRB | 200-230 HV |
| KA1 (FeCrAl Alloy) | 200-260 HB | 11-24 HRC | 210-275 HV |
| Titanium | 200-349 HB | 11-35.5 HRC | 210-360 HV |
| Nickel | 190-220 HB | 11-15.7 HRC | 200-230 HV |

The above listed stainless steel, nichrome, FeCrAl alloy, titanium, and nickel, as well as materials with a greater hardness value than those of the above examples, such as ceramic, may be used as the material of end 312. Moreover, the material is not limited to these specific types. As long as the material has a hardness larger than that of the cartridge surface (e.g. silica gel), a person of ordinary skill in the art would know that it may be used to make end 312.

In some embodiments consistent with the current disclosure, the entire heater 310 may be made of the same material as that of end 312. In some other embodiments, it is also possible that the rest portion of heater 310 (e.g. body 311) is made of a material different from that of end 312. The rest portion may also have a greater hardness than that of the cartridge surface. This may allow heater 310 to be inserted into the cartridge and may also extend the life of heater 310, since the insertion and heating may be repeated hundreds or even thousands of times. Generally speaking, the harder the material is, the higher cost it may incur to use that material to manufacture the heater. Therefore, sometimes it is preferable to select a cost-effective material rather than the hardest material to make the heater.

Copper and aluminum are two materials of relatively low hardness compared to the above listed materials. Nonetheless, they may be used as heater material if the parameters of the heater are carefully chosen and tested. Table 2 below shows tested results of four cylindrical heater samples, similar to those shown in FIGS. 3A and 3B.

TABLE 2

Deformation Forces for Sample Heaters of Different Materials

| Material | Parameters/mm (OD × ID × L) | Test Item | Test Result |
|---|---|---|---|
| Copper | Φ6.5 × Φ5.8 × 18 | Horizontal deformation force | 28.3N |
| | | Vertical deformation force | 83.3N |
| | Φ6.5 × Φ5.9 × 18 | Horizontal deformation force | 14.3N |
| | | Vertical deformation force | 34.4N |
| Aluminum | Φ6.5 × Φ5.8 × 18 | Horizontal deformation force | 39.4N |
| | | Vertical deformation force | 59.5N |
| | Φ6.5 × Φ5.9 × 18 | Horizontal deformation force | 19.4N |
| | | Vertical deformation force | 23.7N |

The first parameter OD (Φ6.5) represents the outside diameter of the sample heater, measured as the outer diameter in a cross-section view of the heater. The second parameter ID (Φ5.8 or (Φ5.9) represents the inner diameter of the same heater. Half of the difference between the two parameters indicates the thickness of the sidewall (0.35 mm in the first sample and 0.3 mm in the second sample). The third parameter L (18) represents the length of the heater along its longitudinal axis (for example, axis 501 shown in FIG. 5C). The horizontal deformation force means the minimum force applied horizontally (that is, perpendicular to the longitudinal axis) to the heater that may cause its deformation. The vertical deformation force means the minimum force applied vertically (that is, along the longitudinal axis) to the heater that may cause its deformation. Copper and aluminum may also be used to manufacture end 312 when a cartridge allows insertion of a heater by a force smaller than both the horizontal and vertical deformation forces.

Figure 3C:
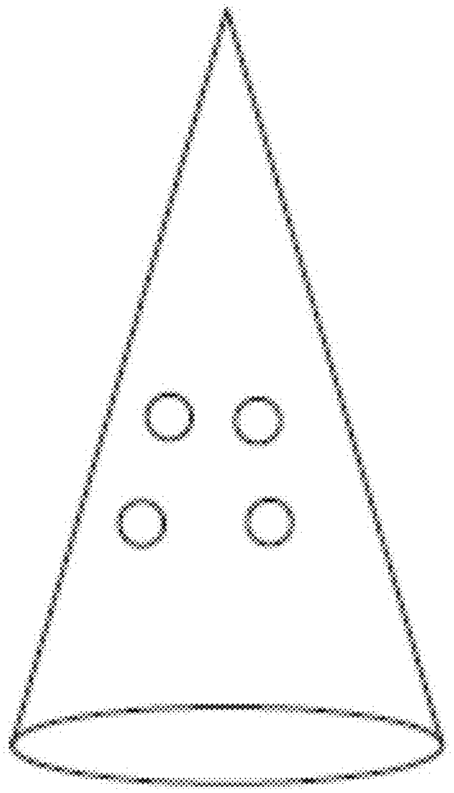
FIGS. 3C-3D illustrate schematic diagrams of exemplary heater bodies, consistent with some disclosed embodiments.
Figure 3D:
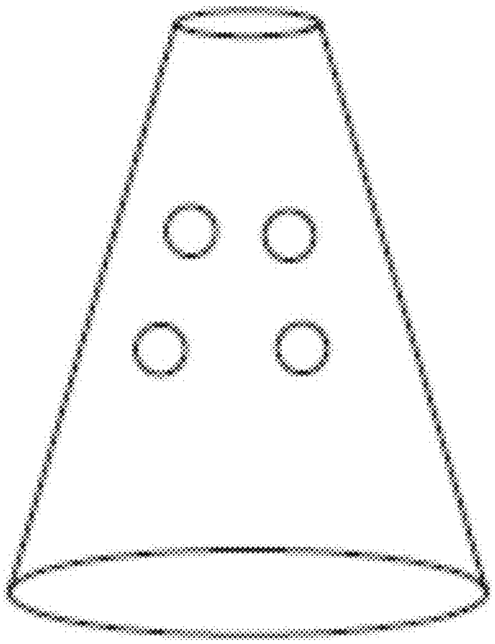

The heater according to the embodiments of the present disclosure may have a variety of shapes. As one illustrative example in FIGS. 3A and 3B, body 311 may be manufactured to have a tube shape, therefore creating an outlet 314 and a chamber 319 (illustrated by the dotted enclosure) inside body 311. In some other embodiments, the shape of body 311 may be a cone (as shown in FIG. 3C) or a truncated cone (as shown in FIG. 3D), each with a chamber therein (not shown). These shapes may also facilitate insertion of the heater into the heater-less cartridge. The chamber may extend through the entire length of heater 310. Alternatively, the chamber may have a length shorter than that of heater 310 but still long enough to connect to the outside of heater 310 by one or more openings on sidewall 316, so that an aerosol generated from the vaporizable material in the cartridge may flow into the chamber through the openings.

Upon heating of heater 310, the vaporizable material at the outside vicinity of chamber 319 is vaporized to create an aerosol containing vaporized e-liquid. Chamber 319 and opening 317 provide an airflow path for the created aerosol to be vented outside heater 310 at least through outlet 314 when user puffs the vaporization device. Outlet 314 may be at the tip of end 312. Alternatively, outlet 314 may be provided near the tip of end 312 (for example, in a cone-shaped heater body) while achieving similar results. The aerosol flowing into chamber 319 may be further heated within heater 310. This may prevent condensation of the aerosol in chamber 319, which will be further described below in conjunction with the descriptions of the heater-less cartridge.

Figure 4A:
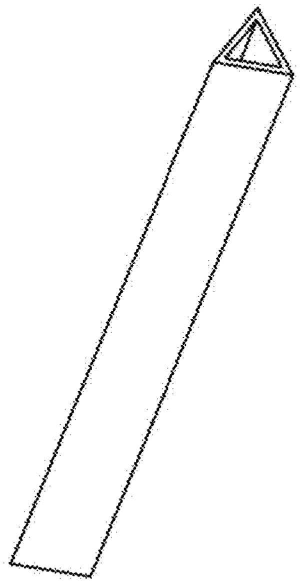
FIG. 4A illustrates a schematic diagram of an exemplary body of the heater, consistent with some disclosed embodiments.
Figure 4B:
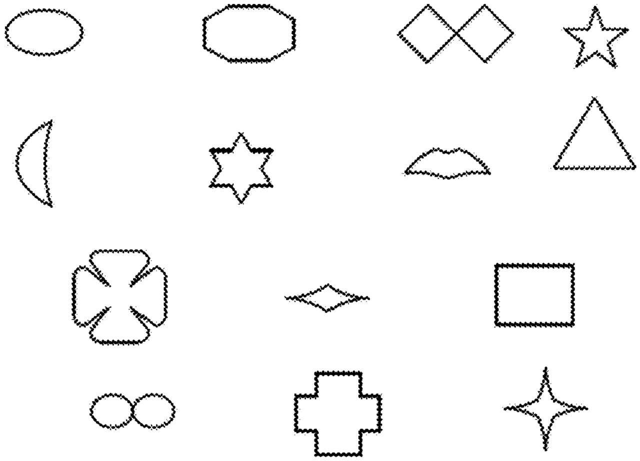
FIG. 4B illustrates cross-sectional views of further examples of the heater body, consistent with some disclosed embodiments.

Although the exemplary body 311 in FIGS. 3A through 3D has a circular cross section, the current disclosure does not limit the shape of the cross section. FIG. 4A illustrates a schematic diagram of an exemplary body of the heater according to another embodiment of the current disclosure. The shape of the cross section of the heater body is a triangle. FIG. 4B illustrates a schematic diagram of further examples of the shape of the cross section of the heater body. As illustrated from left above to right bottom row-by-row, the shape of the cross section of the heater body can be, e.g., an oval, a honeycomb, a double-diamond, a pentagram, a crescent, a hexagram, a bat, a triangle, a four-leaf clover, a four-pointed star, a rectangle (including square), an infinity symbol, a cross, and a star. Moreover, the cross section does not necessarily have to be consistently one shape across the entire length of the heater body. Rather, in some embodiments that the heater body may contain two or more differently shaped cross sections, as long as a chamber can be formed and the intended purpose of the current disclosure can be realized.

Figure 5A:
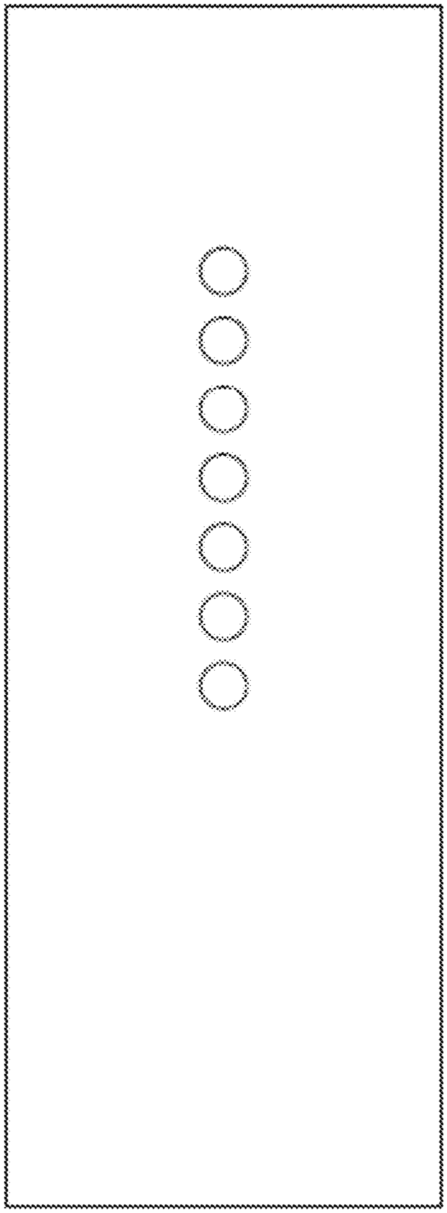
FIGS. 5A-5C illustrate schematic diagrams of exemplary heaters with a plurality of openings, consistent with some disclosed embodiments.
Figure 5B:
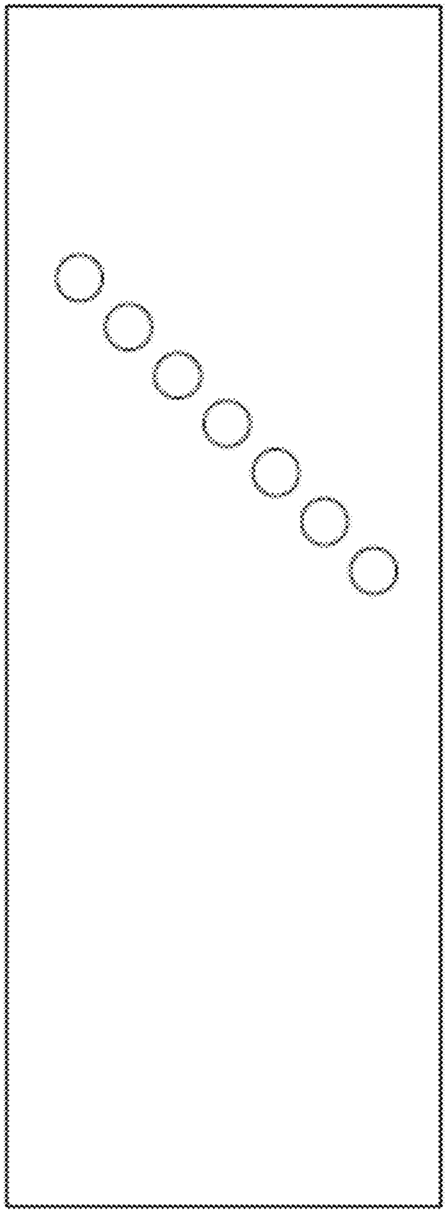

Consistent with embodiments of the present disclosure, heater 310 may include one or more openings 317 on its sidewall 316. Opening 317 may include a single opening as shown in FIGS. 3A and 3B. It may also include a plurality of openings as illustrated in FIGS. 5A and 5B. Opening 317 not only allows the aerosol to enter chamber 319 of heater 310, but also provides an air inlet that helps deliver the aerosol through the chamber to the user when the user puffs the vaporization device from a mouthpiece connected to the cartridge. Therefore, as long as these two purposes are achieved, there are no specific restrictions on the number of openings and their positioning/alignment on the sidewall.

Figure 5C:
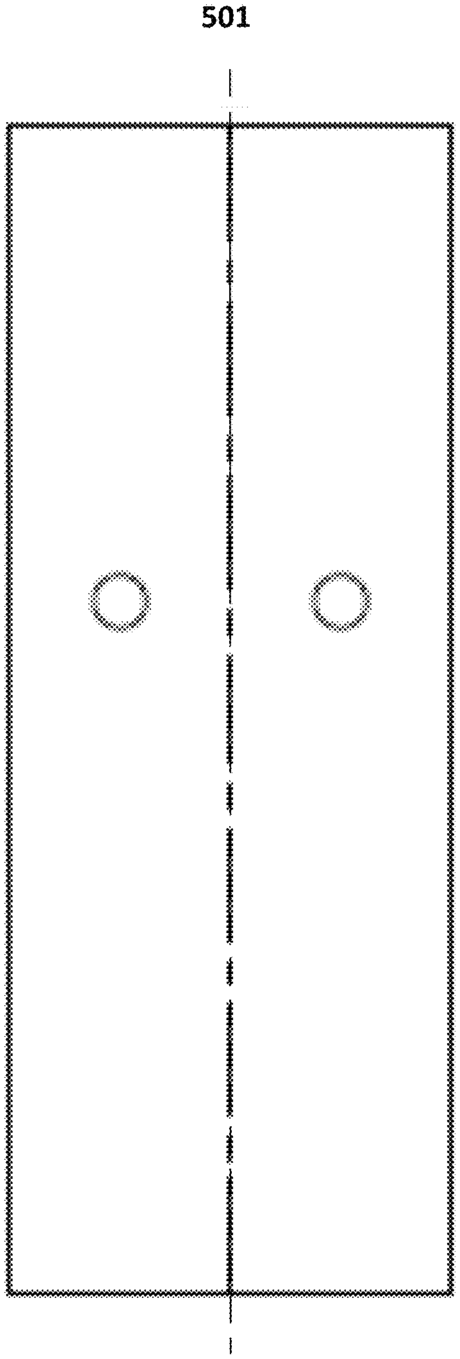

Nonetheless, to obtain better thermal efficiency and to enhance users' vaping experience, several preferred embodiments are disclosed herein. For example, at least one or more openings may be provided on the lower half of the heater body, which means they are closer to the second end (for affixation) than the first end (for insertion). This is because the vaporizable material in the cartridge tends to sink towards the second end due to gravity and thus concentrates more on the lower part of a wick in the cartridge than on the upper part. Having the openings near the higher concentration of vaporizable material would increase the amount of aerosol being generated with the same amount of heat. In another example, multiple openings may be aligned to be rotationally symmetric along a longitudinal axis of the heater. The phrase "rotational symmetry" or "rotationally symmetric" used in this disclosure means that the openings are aligned on the sidewall in a way that the pattern of these openings may look the same after a partial (less than 360-degree) rotation along an axis. For example, FIG. 5C shows an exemplary heater with two openings and one axis 501, of which a sidewall is unwound flat. The two openings may look the same after being rotated for 180 degrees along axis 501, and therefore can be said to be rotationally symmetric with each other along axis 501. The rotationally symmetric configuration of the openings helps increase the heating efficiency and, as a result, the aerosol may be purified as compared to other configurations of the openings.

Figure 6:
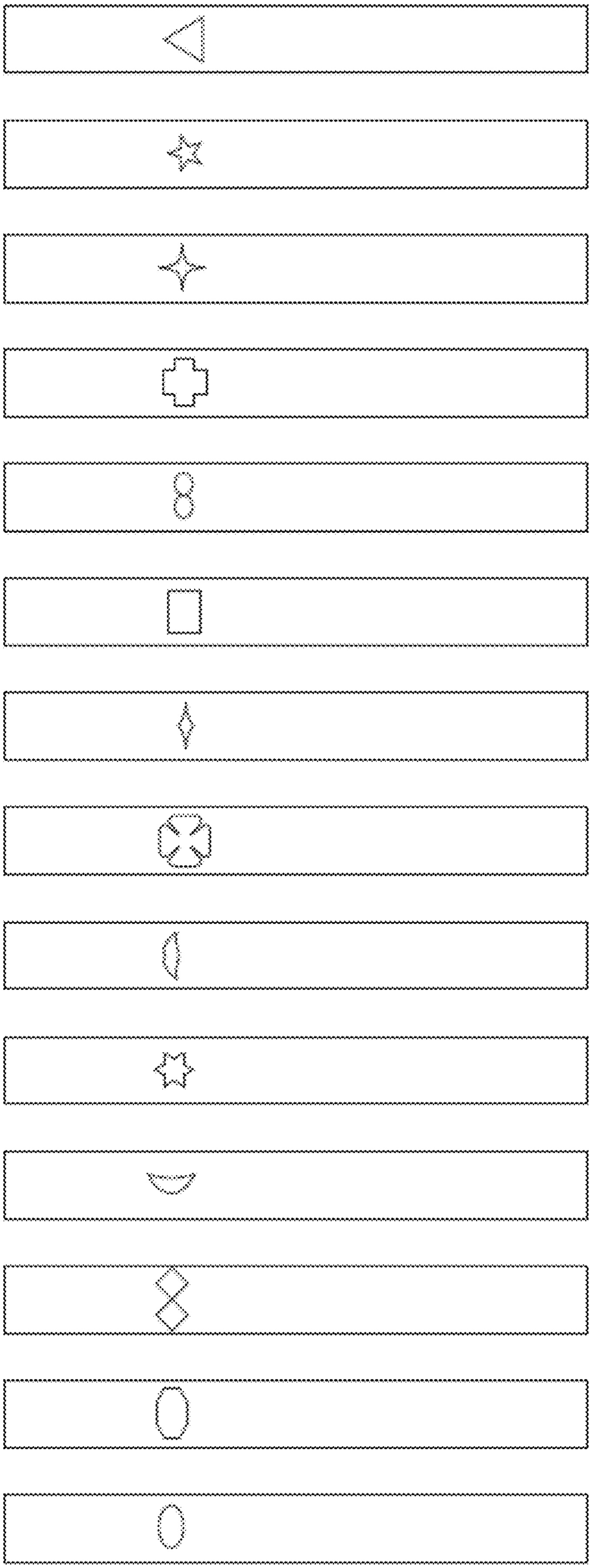
FIG. 6 illustrates schematic diagrams showing the shapes of the openings in exemplary heaters, consistent with some disclosed embodiments.

In FIGS. 3A and 3B, the shape of opening 317 is a circle. More examples of the shape of opening 317 are illustrated in FIG. 6. The shape can be, e.g., an oval, a honeycomb, double-diamonds, a crescent, a hexagram, a bat, a four-leaf clover, a four-pointed star, a rectangle (including square), an infinity symbol, a cross, a star, a pentagram, and a triangle. When there are multiple openings on the sidewall, the openings do not necessarily have to be the same shape. Rather, it is conceived that the heater body may contain two or more differently shaped openings, as long as the opening can serve as an inlet for both vaporizable material and air into the chamber of the heater.

Figure 5D:
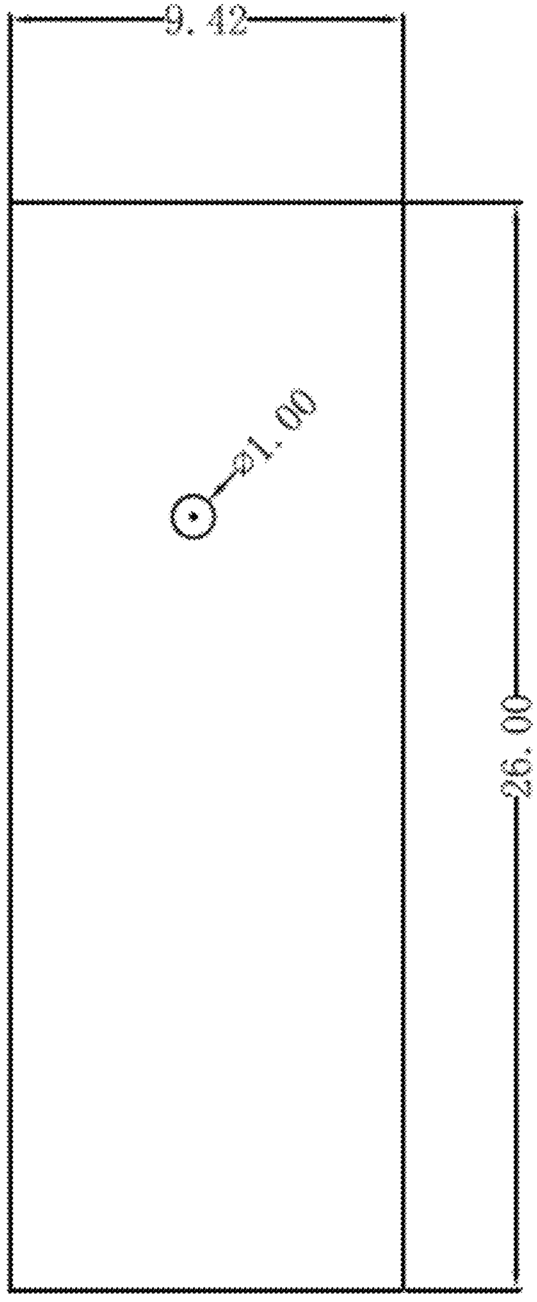
FIG. 5D illustrates a schematic diagram of the relative dimensions between the opening and the sidewall of an exemplary heater, consistent with some disclosed embodiments.

FIG. 5D illustrates a schematic diagram of the relative dimensions between the opening and the sidewall of an exemplary heater, consistent with some disclosed embodiments. As shown in FIG. 5D, the opening is a circle with a diameter (D) of approximately 1 mm. The cylindrical sidewall has an outer circumference (C) of approximately 9.42 mm and a length (L) of approximately 26 mm. The ratio (R) of areas between the opening and the sidewall may be calculated by Equation 1 below:

$$R = \frac{\pi D^2}{4CL} \quad \text{Eq. 1}$$

Thus, the example in FIG. 5D has an opening-vs-sidewall area ratio of approximately 0.32%. When there are multiple openings, the opening-vs-sidewall area ratio may be calculated by Equation 2 below, which is a more complicated function that takes into account the area of each opening ($S_1$, $S_2$, . . . , $S_k$):

$$R = \sum_{n=1}^{k} \left(\frac{S_n}{CL}\right) \quad \text{Eq. 2}$$

The equation adds up the total areas of all the openings and then divides the value by the total surface area of the sidewall. To obtain a better thermal efficiency and to enhance users' vaping experience, the R is preferred to have a value of not less than 0.32%.

Figure 7:
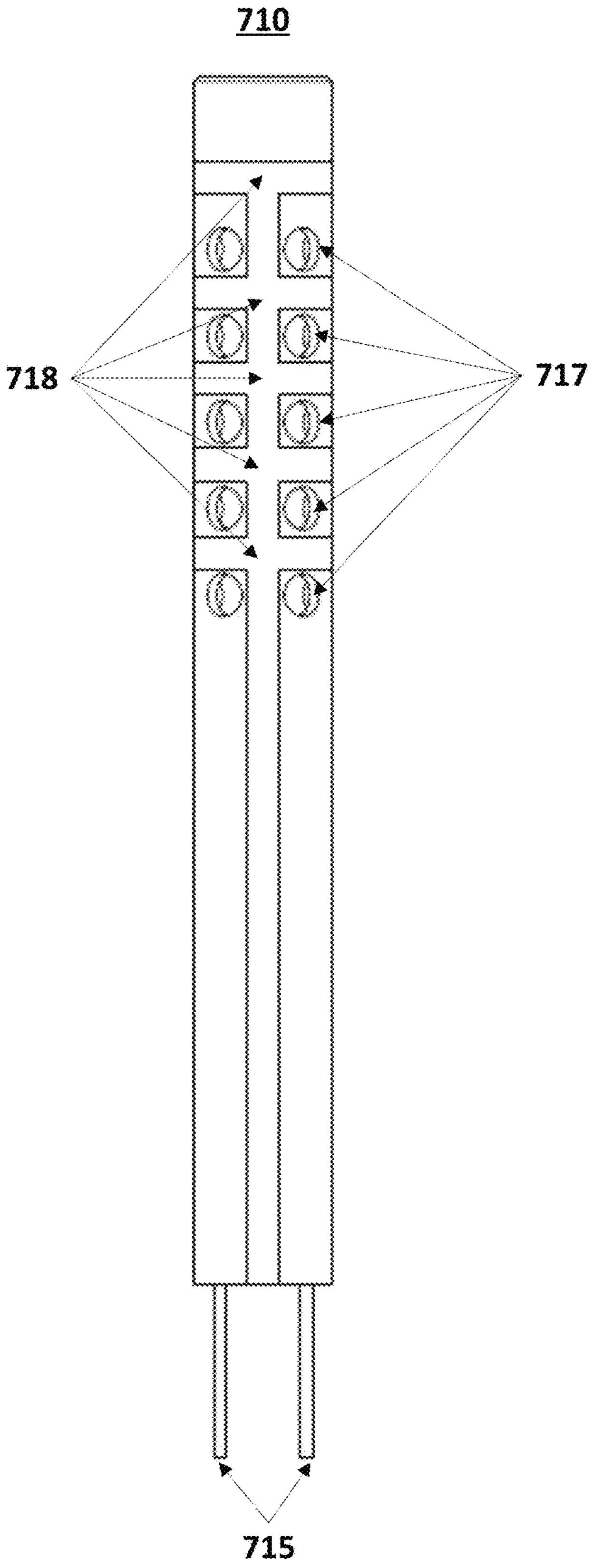
FIG. 7 illustrates a schematic diagram of an exemplary heater with heating material, consistent with some disclosed embodiments.

In some embodiments consistent with the current disclosure, the heater of the vaporization device may be heated by thermal energy passing directly to its body. In other embodiments, the heater body may be heated through a heating material covering at least a portion of the body, and thus transmitting thermal energy to the body. FIG. 7 illustrates a schematic diagram of an exemplary heater with heating material. Heater 710 may include a heating material 718 that converts electrical energy received from electric wire 715 into thermal energy and is thermally connected to the heater body.

Examples of heating material 718 may include a resistive heating element, such as a thin film with printed circuit thereon. The thin film may generate heat when a current passes through the circuit. The printed circuit may be in the form of one or more electric wires that may be configured to have a predetermined resistance. Based on the resistance, the internal signal processing and control circuit of the vaporization device may perform temperature control of the heater. The thin firm can be manufactured to have a thickness of 0.05 mm or less, so that the additional thin layer covering the heater body will have little or no impact to the penetration ability of the heater when it is inserted into the cartridge. In addition, a film significantly thinner than the sidewall may not be easily peeled off or deformed when the heater is inserted into the cartridge and passes by the wick or other components therein. For example, the sidewall of the current disclosure may be 0.15 mm or above in order to maintain a hardness and thickness suitable for ordinary use.

The thin film can be of any shape. The example in FIG. 7 shows the thin film to include a plurality of T shapes stacking on top of each other. The heating material may be preferably configured to avoid covering opening 717, which otherwise would impede the flow of air or aerosol into the chamber of the heater body.

Figure 8:
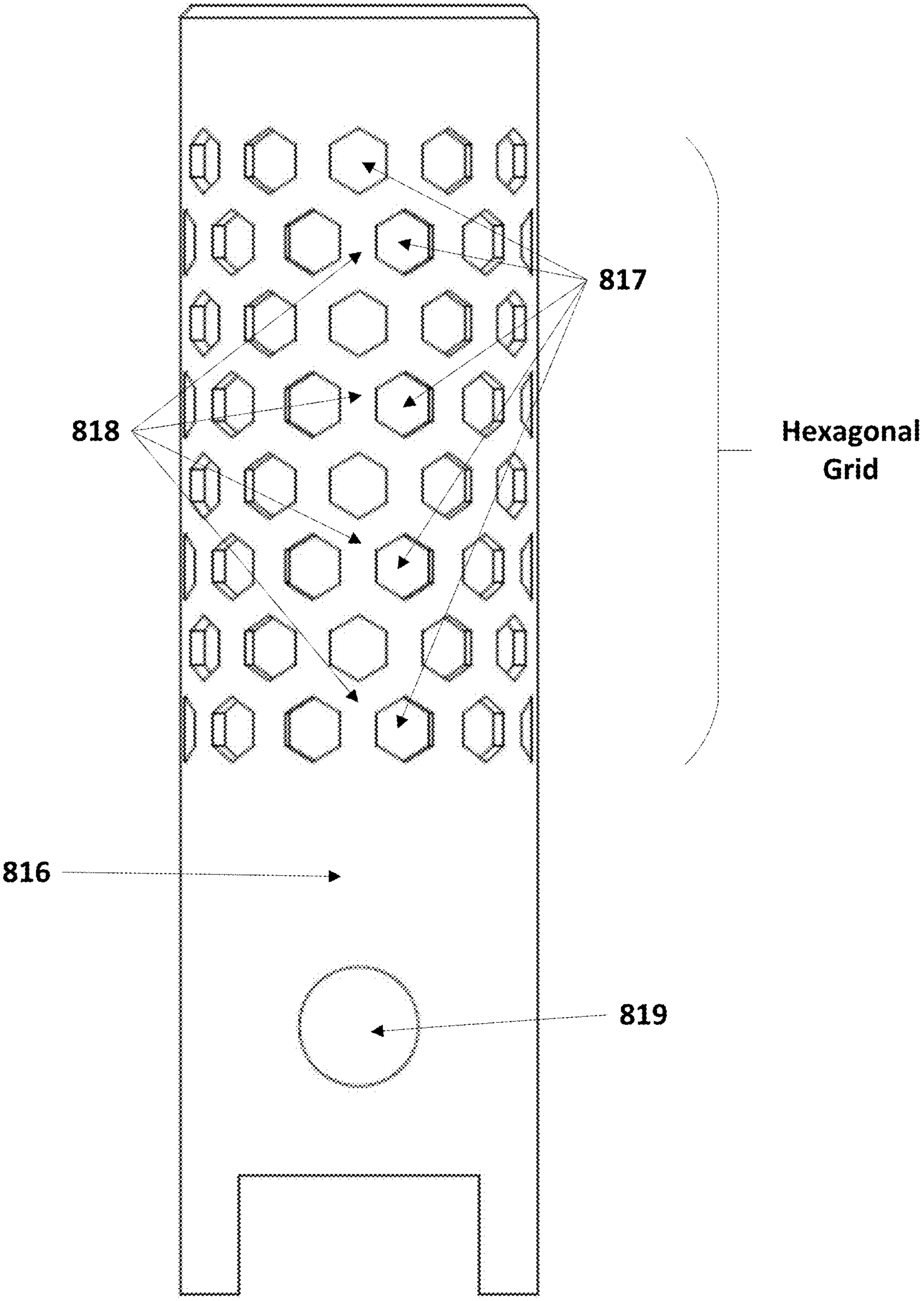
FIG. 8 illustrates a schematic diagram of another exemplary heater with heating material, consistent with some disclosed embodiments.

FIG. 8 illustrates a schematic diagram of another exemplary heater with heating material, consistent with some embodiments in the current disclosure. All openings 817 on a sidewall 816 of a heater 810 are honeycomb-shaped and constitute a hexagonal grid. The hexagonal grid on sidewall 816 may circle around the outer surface of heater 810. A thin film 818 may cover the entirety of the sidewall in the hexagonal grid area other than the openings. The honeycomb-shaped openings have the advantage over other shapes of openings in that the surface of heater 810 within the hexagonal grid area may be divided into regions of equal area with least total perimeter. In practice, this configuration of openings reduces the amount of resistive heating element needed in thin film 818, and also causes thin film 818 to have homogenous area between each pair of adjacent openings, thus decreasing potential damages caused by uneven heating due to variation in the size of the printed circuits on thin film 818. Moreover, it is easier to calculate the resistance of thin film 818 in such a homogenous layout of resistive heating element, which may additionally assist temperature control.

In some further embodiments consistent with the current disclosure, an insulation layer may be coated between the body and the heating material. For example, the insulation layer may be coated on the body of the heater and underneath the heating material, thereby cutting off any current flow between the body (e.g. a conductive material) and the heating material (e.g. a thin film with printed circuit). This may reduce the risk of short circuit or variation in resistance value of the printed circuit, which is caused by electrical contact between the heater body and the thin film.

The current disclosure further provides a cartridge without a heater. A cartridge is the place where vaporization occurs. In some embodiments, the cartridge can be an atomizer-plus-tank, a cartomizer, or a clearomizer.

Atomizer-plus-tank is the earliest generation of the cartridge of a modern day EVD. The atomizer may contain a small heating element (e.g., metal coil). The tank may house the e-liquid and the wicking material. The e-liquid is the mixture used in the vaporization device. It may contain propylene glycol (PG), vegetable glycerin (VG), and flavorings. PG is a viscous, colorless, and almost odorless liquid that tastes sweet. VG is a colorless, odorless, viscous liquid that also tastes sweet. Different ratios of PG-vs-VG may create different vaping experiences, such as a varying density of the vapor cloud. Flavorings can be artificial or natural and provide a more enjoyable experience to the user. Although not always, the e-liquid may further include nicotine or other substances for medical use. The wicking material is able to draw the e-liquid onto the heating element of the atomizer. When heated, the heating element may vaporize the e-liquid to create an aerosol for user's inhalation.

The cartomizer is a newer generation of the cartridge, which integrates the heating element into an inner chamber. The heating element may be surrounded by a wicking material soaked with the vaporizable material. When heat is applied, the soaked material is vaporized to create the aerosol. A cartomizer is usually discarded after all vaporizable material is used up, because its heating element may not be replaced or may require a lot of time and efforts to be replaced.

The clearomizer is the most recent generation of the cartridge, which provides a transparent or translucent tank that allows the user to monitor the amount of remaining e-liquid in the vaporization device.

Figure 9A:
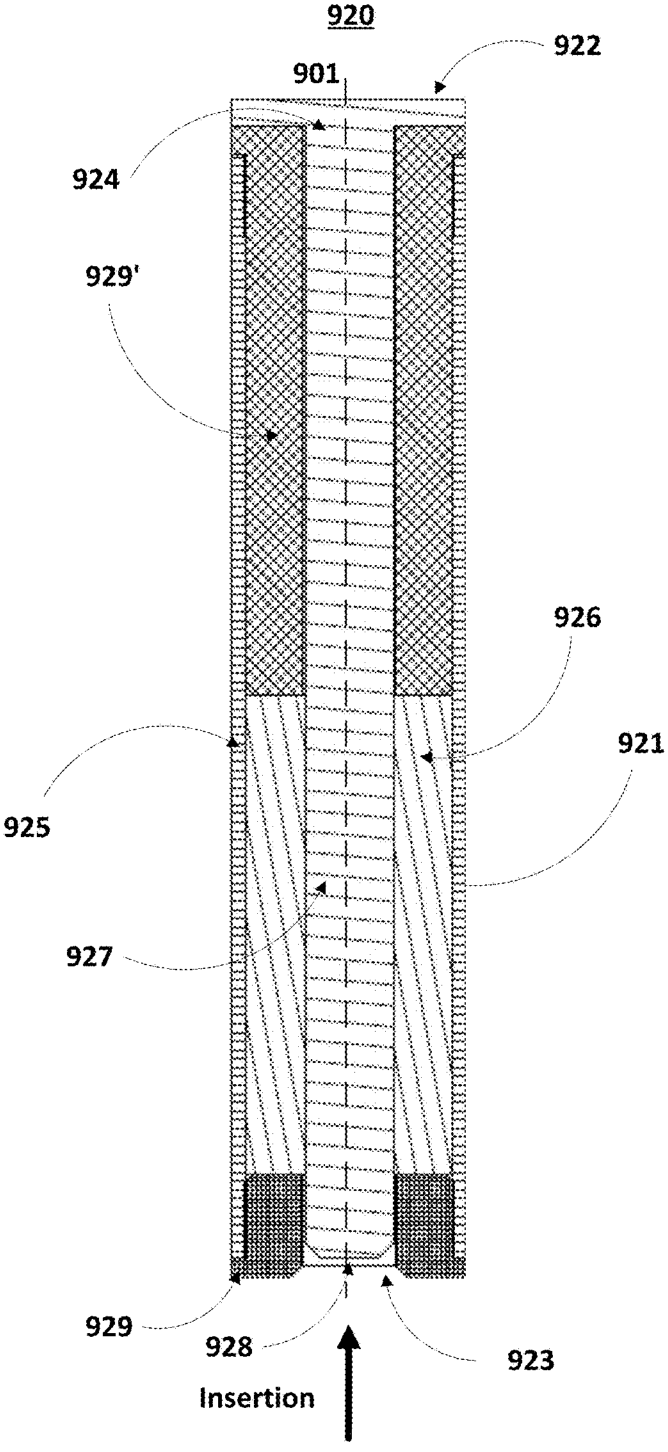
FIG. 9A illustrates a cross-sectional view of an exemplary cartridge, consistent with some disclosed embodiments.

FIG. 9A illustrates a cross-sectional view of an exemplary disposable cartridge consistent with the embodiments of the present disclosure. A disposable cartridge may be discarded after the vaporizable material is exhausted and the vaporizable material may not be refilled. Cartridge 920 may have a casing 921 with a top end 922, a bottom end 923, and a longitudinal axis 901 extending through top end 922 and bottom end 923. Top end 922 and bottom end 923 may or may not have the same design or dimensions. To distinguish between the two ends, bottom end 923 may be defined as the end of casing 921 into which a heater is to be inserted, as shown in FIG. 9A.

Cartridge 920 may further include a container 925. Container 925 can be transparent, translucent, or opaque. It may extend through the entire length of casing 921 along axis 901, from top end 922 to bottom end 923. Alternatively, it may be shorter than the entire length of casing 921. Although container 925 depicted in FIG. 9A has a cylinder shape, it is not limited to such a shape and may be of any other shape.

Container 925 may be configured to house a wick 926 and a vaporizable material (not shown). The vaporizable material may be an e-liquid as described above. It may also include nicotine salts, which comprises nicotine that is found in its natural state within the tobacco leaf and requires a higher temperature to be effectively vaporized. The vaporizable material can be cannabidiol ("CBD") that may be suitable for medical use, or tetrahydrocannabinol ("THC") that may be suitable for recreational use. It is noted that use of CBD and THC may vary depending on the laws of the jurisdictions where the intended use is carried out. That said, the present disclosure is technically applicable to all vaporizable materials described herein.

Figure 9B:
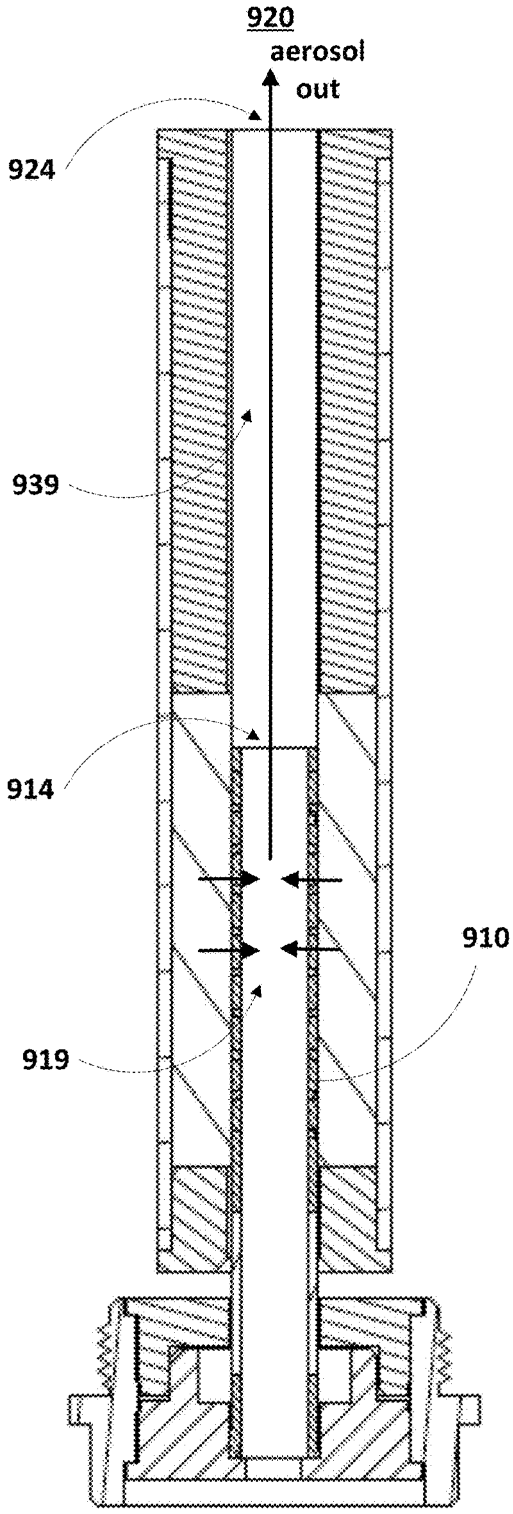
FIG. 9B illustrates a cross-sectional view of the exemplary cartridge in FIG. 9A when a heater is inserted therein, consistent with some disclosed embodiments.

When the vaporizable material is a liquid, wick 926 is in contact with the liquid vaporizable material, soaks the material, and delivers it to vicinity of the inserted heater through a capillary action. The capillary action occurs when liquid flows in narrow spaces without the assistance of, or even in opposition to, external forces (e.g., gravity). Porous materials often support capillary actions, and therefore can be used to make wick 926. Such porous materials of wick 926 may include cotton, sponge, microporous ceramic, paper, fiberglass, chemical fiber, or other macromolecular materials. The vaporizable material near the heater may be vaporized to generate an aerosol when the heater is raised to a high temperature, for example, 100-280° C. The actual temperature of the heater may be adjusted according to the vaporization temperature of the material housed in container 925. The vaporization temperature indicates the temperature at which a liquid material starts to become vapor. The generated aerosol may flow or be drawn (by, for example, user puffing) into chamber 919 inside heater 910 through one or more openings on the sidewall of heater 910, as shown in FIG. 9B. Chamber 919 may further heat the aerosol to prevent condensation of the aerosol. Condensation occurs when the physical state of the material changes from gas phase into liquid phase. It is the reverse process of vaporization. Therefore, the embodiments of the present disclosure may provide twofold heating to the vaporizable material, both at the outside vicinity of and inside the heater body, thus enhancing thermal efficiency and users' vaping experience.

Cartridge 920 may further have a support 927 inside the casing, which may extend at least partially along longitudinal axis 901. The longitudinal axis of support 927 (not shown) does not necessarily overlap with axis 901 though. It may shift from, but run parallel to, axis 901. Support 927 may serve as a stopper that prevents the vaporizable material from leaking out of the cartridge before a heater is inserted. In the embodiment shown in FIG. 9A, support 927 may physically contact wick 926 while having a length longer than wick 926, so that the vaporizable material soaked in wick 926 will not further drip down the path and to the outside of cartridge. It may also hold wick 926 in good shape when a heater is inserted into cartridge 920 in a way similar to pushing a plunger into a syringe. Without support 927, the vaping efficiency may decrease significantly as wick 926 may be squeezed into smaller parts resulting in a shrunken contact area between wick 926 and the heater.

Consistent with the embodiments of the current disclosure, support 927 may be a guiding rod, or other slim sticks, as shown in FIG. 9A. Support 927 may be made of any material that does not have chemical reactions with the vaporizable material. Preferably, support 927 may be made of a lightweight material that reduces the overall weight of cartridge 920 for user to easily carry around. It may also have a hardness lower than that of the insertion end of the heater, so that the heater may be inserted into the cartridge without being deformed, therefore extending the life of the heater. Suitable materials for making support 927 include silica gel, plastic, synthetic resin, or even metal (such as aluminum or copper) or alloy (such as stainless steel), as long as its hardness does not cause deformation of the heater when the heater is being inserted.

Cartridge 920 may also include an aerosol outlet 924 near top end 922, as shown in FIG. 9A. FIG. 9B illustrates a cross-sectional view of the exemplary cartridge in FIG. 9A when a heater is inserted therein. Support 927 may be moved to expose aerosol outlet 924 when heater 910 with an opening 914 is inserted. More specifically, support 927 may be completely removed from cartridge 920 so that an extended airflow path 939 is formed in addition to the airflow path in chamber 919 of heater 910. Therefore, when the user puffs the top end of cartridge 920, heater 910 may be heated to generate an aerosol from the vaporized material at the outside vicinity of and inside the heater body, and the aerosol may be further pushed out of chamber 919 and airflow path 939 and vented through aerosol outlet 924. Optionally, a mouthpiece (not shown) may be mounted on top of top end 922 of cartridge 920, making it easier for user to puff the vaporization device. The mouthpiece also has an outlet through which the aerosol is further vented.

In some other embodiments, aerosol outlet 924 may be an opening on a side of casing 921 near top end 922 of cartridge 920 and may face towards the side. For example, the distance between top end 922 and aerosol outlet 924 may be smaller than ½ of the length of cartridge 920. In these embodiments, support 927 is not completely removed out of cartridge 924 and may remain at least partially within cartridge 924. If the user wants to switch the cartridge before the vaporizable material is exhausted, the user may simply push support 927 back into its original place and force heater 910 out of cartridge 924. This may save the unused vaporizable material in the cartridge for future consumption. Aerosol outlet 924 in these embodiments is preferable to be on a part of the side of casing 921 that is not in contact with wick 926, since any contact might cause the vaporizable material to leak outside of casing 921 due to the large size of outlet 924. Furthermore, support 927 according to these embodiments may have a hollow interior that forms an airflow path. The airflow path may be connected with the airflow path of chamber 919 of heater 910 so that the two paths may be conjoined for the aerosol to pass by before being vented through aerosol outlet 924.

Cartridge 920 according to some embodiments may further include a slot 928. Slot 928 may be located near bottom end 923 of casing 921. Slot 928 may be configured to allow insertion of heater 910. When viewing from underneath and facing towards bottom end 923, slot 928 may have a round, square, rectangular, or triangular shape, or other shapes that may permit the insertion. Slot 928 may be covered by a material (not shown) penetrable by heater 910, for example, a plastic film. When a user inserts heater 910 towards slot 928, the film will be broken and heater 910 may be inserted into cartridge 920. In some other embodiments, slot 928 may be covered by a removable cap. The cap may be a click-on type that can be flipped open. It may also be a rotating cap similar to a water bottle cap. The user may open the cap and insert heater 910 into cartridge 920. In yet some other embodiments, slot 928 does not necessarily have to be covered. It may be sealed airtight by support 927. This can be achieved by configuring the shape of slot 928 to match that of the bottom part of support 927 so that support 927 may fill the entire open area of slot 928, thus sealing it airtight.

Cartridge 920 according to some embodiments may further include one or more reinforcing member 929. Reinforcing member 929 may be provided at or near bottom end 923 of casing 921. FIG. 9A shows reinforcing member 929 is provided at bottom end 923, which means reinforcing member 929 touches or protrudes from bottom end 923. Alternatively, reinforcing member 929 may be provided near bottom end 923, for example, at a distance between bottom end 923 and reinforcing member 929 that is smaller than ½ of the length of cartridge 920. Reinforcing member 929 may have a ring-like shape with an opening on one end that forms slot 928. The other end of reinforcing member 929 may be in physical contact with wick 926. Reinforcing member 929 may serve as an insertion port that guides heater 910 to smoothly enter cartridge 920 without causing deformation on wick 926, as shown in FIGS. 9A and 9B.

In some other embodiments, reinforcing member 929' may be provided at or near upper end 922 of casing 921. The phrases "at" and "near" may have the same meaning as those used in the paragraph above. Similarly, reinforcing member 929' in these embodiments may have an opening on one end that serves as a removal port that guides support 927 to be partially or completely removed from cartridge 920. The other end may be in physical contact with wick 926.

Figure 10A:
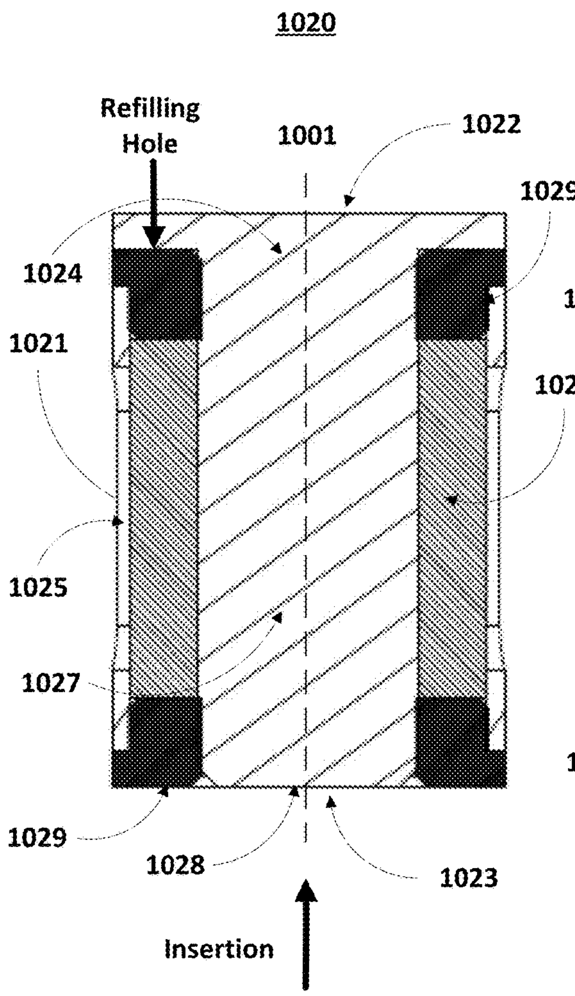
FIG. 10A illustrates a cross-sectional view of another exemplary cartridge, consistent with some disclosed embodiments.

FIG. 10A illustrates a cross-sectional view of an exemplary refillable cartridge consistent with the embodiments of the present disclosure. A refillable cartridge may be reused after the vaporizable material is exhausted and the vaporizable material may be refilled.

Similar to cartridge 920 in FIGS. 9A and 9B, cartridge 1020 in FIG. 10A may have a casing 1021 with a top end 1022, a bottom end 1023, and a longitudinal axis 1001 extending through top end 1022 and bottom end 1023. Cartridge 1020 may further include a container 1025, which may be configured to house a wick 1026 and a vaporizable material (not shown). Cartridge 1020 may further have a support 1027 inside the casing. Cartridge 1020 may also include an aerosol outlet 1024 near top end 1022, as shown in FIG. 10A. Cartridge 1020 may also include a slot 1028, which may be located near bottom end 1023 of casing 1021. Further, cartridge 1020 may further be provided with one or more reinforcing member 1029.

Figure 10B:
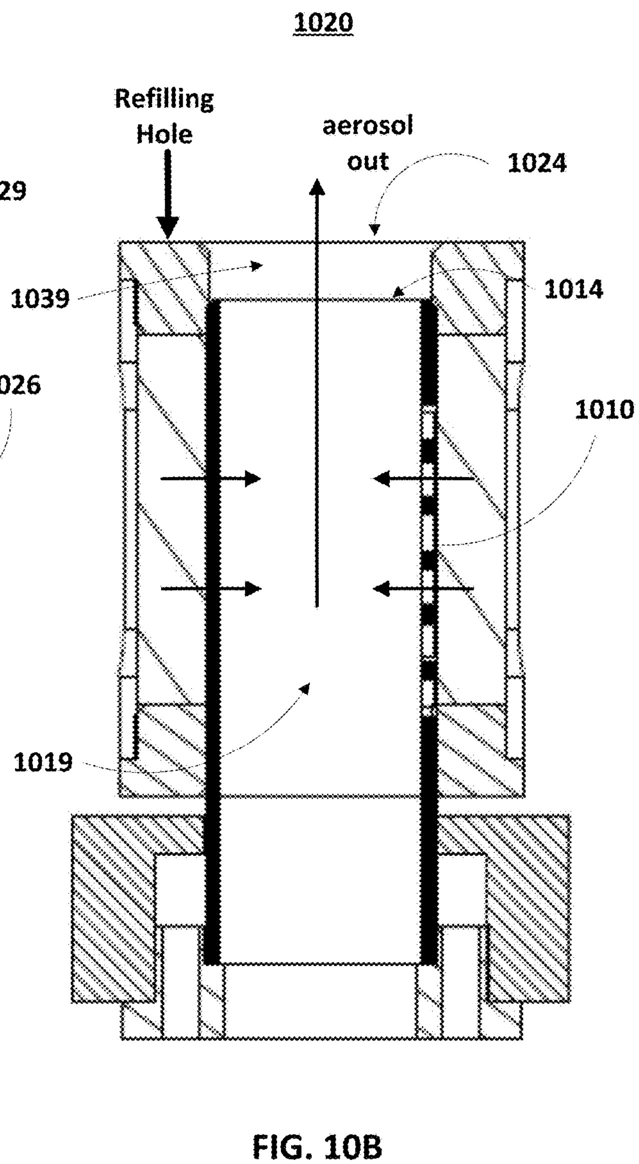
FIG. 10B illustrates a cross-sectional view of the exemplary cartridge in FIG. 10A when a heater is inserted therein, consistent with some disclosed embodiments.

FIG. 10B illustrates a cross-sectional view of the exemplary cartridge in FIG. 10A when a heater is inserted therein. When a heater 1010 with an opening 1014 is inserted into cartridge 1020, support 1027 may be moved to expose aerosol outlet 1024. When heater 1010 is heated, an aerosol may be generated from the vaporizable material at the outside vicinity of and inside the heater body, and the aerosol may be further pushed out of chamber 1019 and airflow path 1039 and vented through aerosol outlet 1024.

The configurations and functions of these parts and components of cartridge 1020 in FIGS. 10A and 10B are similar to those of cartridge 920 in FIGS. 9A and 9B, and therefore will not be repeated here. One difference between disposable cartridge 920 and refillable cartridge 1020 is that cartridge 1020 has a refilling hole on the casing that allows the vaporizable material to be added or poured out of container 1025. The refilling hole can be on any part of casing 921 and may be covered by a cap or a plug.

Figure 11A:
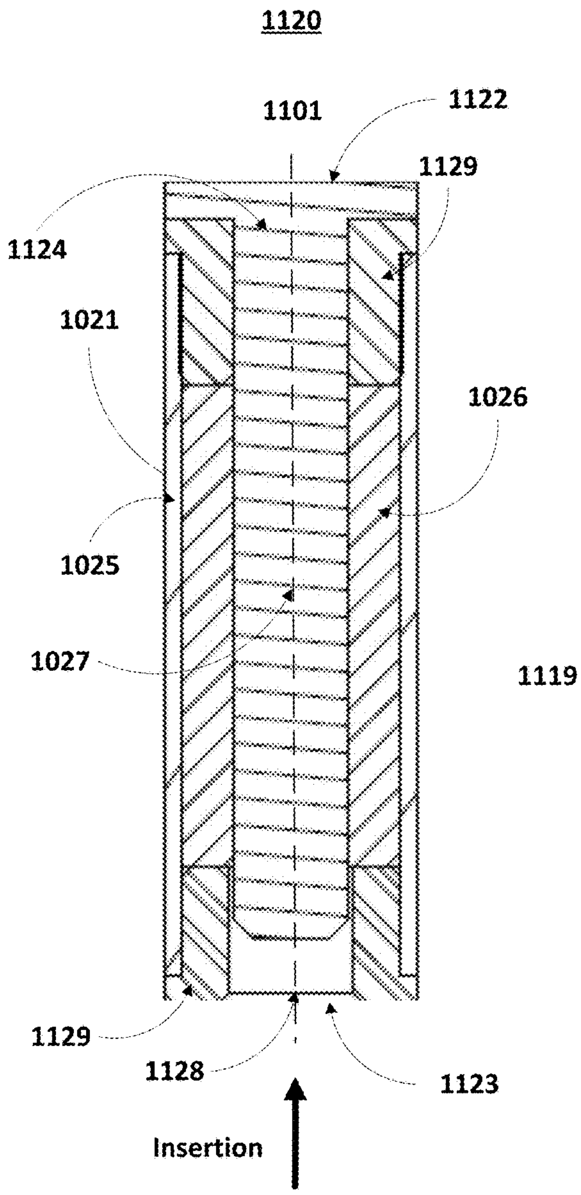
FIG. 11A illustrates a cross-sectional view of yet another exemplary cartridge, consistent with some disclosed embodiments.

FIG. 11A illustrates a cross-sectional view of an exemplary cartridge for a pod system consistent with the embodiments of the present disclosure. The cartridge for a pod system may or may not be refillable.

Similar to cartridge 920 in FIGS. 9A and 9B and cartridge 1020 in FIGS. 10A and 10B, cartridge 1120 in FIG. 11A may have a casing 1121 with a top end 1122, a bottom end 1123, and a longitudinal axis 1101 extending through top end 1122 and bottom end 1123. Cartridge 1120 may further include a container 1125, which may be configured to house a wick 1126 and a vaporizable material (not shown). Cartridge 1120 may further have a support 1127 inside the casing. Cartridge 1120 may also include an aerosol outlet 1124 near top end 1122, as shown in FIG. 11A. Cartridge 1120 may also include a slot 1128, which may be located near bottom end 1123 of casing 1121. Further, cartridge 1120 may further be provided with one or more reinforcing member 1129.

Figure 11B:
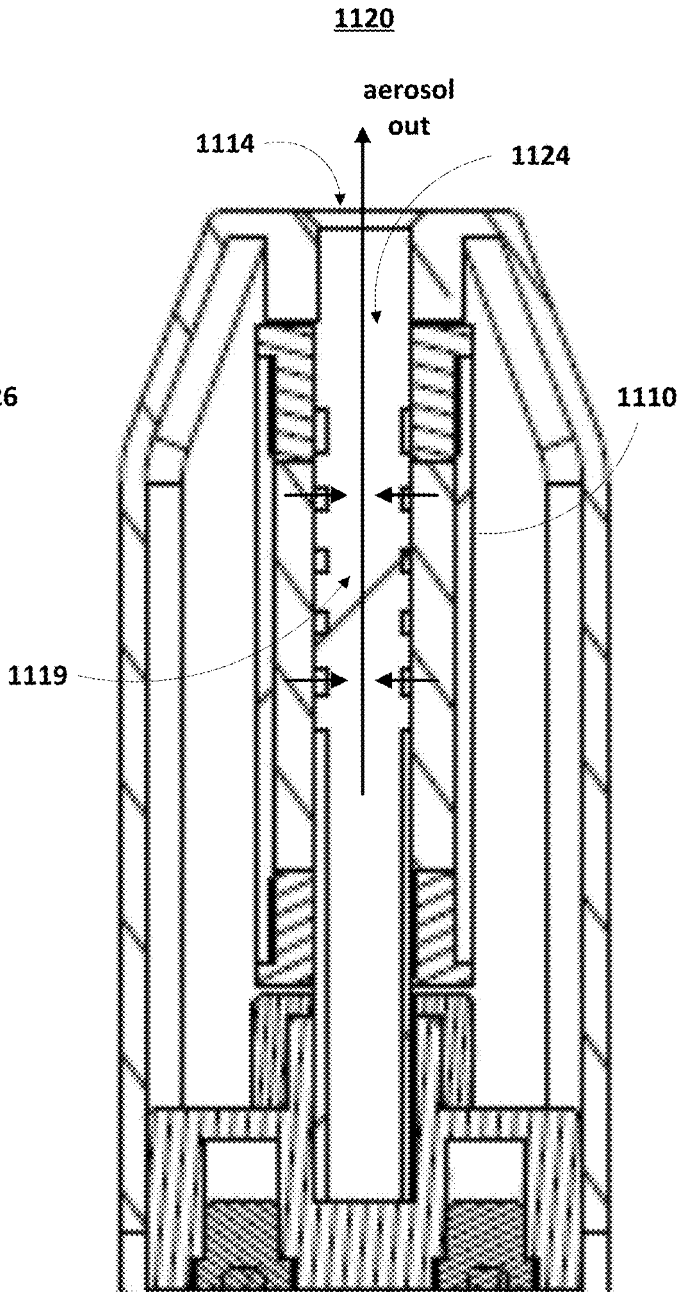
FIG. 11B illustrates a cross-sectional view of the exemplary cartridge in FIG. 11A when a heater is inserted therein, consistent with some disclosed embodiments.

FIG. 11B illustrates a cross-sectional view of the exemplary cartridge in FIG. 11A when a heater is inserted therein. When a heater 1110 with an opening 1114 is inserted into cartridge 1120, support 1127 may be moved to expose aerosol outlet 1124. When heater 1110 is heated, an aerosol may be generated from the vaporizable material at the outside vicinity of and inside the heater body, and the aerosol may be further pushed out of chamber 1119 and vented through aerosol outlet 1124.

The configurations and functions of these parts and components of cartridge 1120 in FIGS. 11A and 11B are similar to those of cartridge 920 in FIGS. 9A and 9B and cartridge 1020 in FIGS. 10A and 10B, and therefore will not be repeated here. One difference between cartridge 1120 and cartridges 920, 1020 is that the length of cartridge 1120 is shorter than that of heater 1110. As a result, heater 1110 in FIG. 11B may be inserted through the entire length of cartridge 1120 along longitudinal axis 1101 and protrudes outside aerosol outlet 1024. This allows the aerosol to flow entirely within heater 1110 before it is vented out through opening 1114.

In each of the exemplary vaporization devices shown in FIGS. 9A through 11B, the heater body is preferred to be longer than the length of the wick along the respective longitudinal axis. This may prevent the vaporizable material from leaking into chambers 919, 1019, 1119 from outlets 914, 1024, 1124 when the heater body is fully inserted into the cartridge. Thus, varying degrees of vaporization may be reduced and the vaping experience may be more consistent.

Heaters, cartridges, and vaporization devices according to the current disclosure have numerous advantages. For example, the heaters according to the current disclosure may be reused at least hundreds of times, and are compatible with many different types of cartridges without the need to adjust the overall structure. The heaters also provide twofold heating to the vaporizable material, both at the outside vicinity of and inside the heater body, thus enhancing thermal efficiency and users' vaping experience. The cartridges according to the current disclosure are lighter and less costly to manufacture thanks to the lack of a heater disposed therein. The cartridges are easy to use by simply having a heater inserted and moving the structure included therein to expose an aerosol outlet. The vaporization devices comprising both the heaters and the cartridges according to the current disclosure thus benefit from the above-described advantages.

It will be apparent to those skilled in the art that various modifications and variations can be made to the disclosed devices and related apparatuses. Other embodiments will be apparent to those skilled in the art from consideration of the specification and practice of the disclosed devices and related apparatuses.

It is intended that the specification and examples be considered as exemplary only, with a true scope being indicated by the following claims and their equivalents.

What is claimed is:

1. A cartridge, comprising:

a casing having a top end, a bottom end, and a longitudinal axis passing through the top end and the bottom end;

an aerosol outlet at or near the top end;

a container housing a vaporizable material;

a wick in contact with the vaporizable material; and a support detachably coupled to the wick via the top end of the casing and at least partially extending along the longitudinal axis, wherein, aerosol is generated from the vaporizable material when heated, wherein, the support is moved to expose the aerosol outlet when a heater is inserted into the cartridge via the bottom end of the casing, and wherein, a body of the heater is longer than a length of the wick along the longitudinal axis.

2. The cartridge of claim 1, wherein the aerosol outlet is on a side of the casing and near the top end, and the distance between the bottom end and the aerosol outlet is smaller than ½ of the length of the heater-less cartridge.

3. The cartridge of claim 1, further comprising: a slot near the bottom end of the casing, wherein the slot is configured to allow insertion of the heater, wherein the slot is covered by a removable cap before the heater is inserted.

4. The cartridge of claim 1, wherein the container is transparent or translucent.

5. The cartridge of claim 1, wherein the support is arranged as a stopper and configured to prevent the vaporizable material from leaking from the cartridge prior to the heater being inserted into the cartridge.

6. The cartridge of claim 1, wherein the support is in physical contact with an interior surface of the wick.

7. The cartridge of claim 1, wherein the support is configured to support and maintain an original shape of the wick while the heater is being inserted into the cartridge.

8. The cartridge of claim 1, wherein the support comprises a guiding rod.

9. The cartridge of claim 1, wherein the support comprises at least one of silica gel, plastic, synthetic resin, metal, or metal alloy.

10. The cartridge of claim 1, wherein the support is configured to expose the aerosol outlet when the heater is inserted.

11. The cartridge of claim 1, wherein the support is configured to be completely removed when the heater is inserted.

12. The cartridge of claim 1, wherein at least a portion of the support remains in the cartridge when the heater is inserted into the cartridge.

13. The cartridge of claim 12, wherein the support has a hollow interior that forms an airflow path for the aerosol to vent through.

14. The cartridge of claim 1, further comprising at least one of:

a reinforcing member at the bottom end of the casing;

a reinforcing member near the bottom end of the casing, wherein the distance between the bottom end and the reinforcing member is smaller than ½ of the length of the cartridge;

a reinforcing member at the top end of the casing; or a reinforcing member near the top end of the casing, wherein the distance between the top end and the reinforcing member is smaller than ½ of the length of the cartridge.

15. The cartridge of claim 1, wherein at least a portion of the wick inside the cartridge is disposed between the body of the heater and a conductive coil of the heater when the heater is inserted into the cartridge.

16. The cartridge of claim 1, further comprising:

a filling hole on the casing, wherein the vaporizable material is refillable through the filling hole.

17. A vaporization device, comprising:

a heater; and a cartridge, the cartridge comprising:

a casing having a top end, a bottom end, and a longitudinal axis passing through the top end and the bottom end, an aerosol outlet at or near the top end, a container housing a vaporizable material, a wick in contact with the vaporizable material, and a support detachably coupled to the wick via the top end of the casing and at least partially extending along the longitudinal axis, wherein, aerosol is generated from the vaporizable material when heated, wherein, the support is moved to expose the aerosol outlet when the heater is inserted into the cartridge via the bottom end of the casing, wherein, a body of the heater is longer than a length of the wick along the longitudinal axis, and wherein, the heater is detachably coupled to the cartridge via the bottom end of the casing.

18. The vaporization device of claim 17, further comprising:

a reinforcing member at the bottom end of the casing, wherein the heater is detachably coupled to the reinforcing member.

19. The vaporization device of claim 17, further comprising:

a reinforcing member at the top end of the casing, wherein the support is detachably coupled to the reinforcing member.

* * * * *